United States Patent
Lin et al.

(10) Patent No.: US 9,223,730 B2
(45) Date of Patent: Dec. 29, 2015

(54) VIRTUAL SYSTEM MANAGEMENT MODE DEVICE AND CONTROL METHOD THEREOF

(71) Applicant: WISTRON CORP., New Taipei (TW)

(72) Inventors: Wen-Tai Lin, New Taipei (TW); Yuan-Chan Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 570 days.

(21) Appl. No.: 13/685,618

(22) Filed: Nov. 26, 2012

(65) Prior Publication Data

US 2013/0246678 A1 Sep. 19, 2013

(30) Foreign Application Priority Data

Mar. 19, 2012 (TW) ............... 101109290 A

(51) Int. Cl.
*G06F 13/32* (2006.01)
(52) U.S. Cl.
CPC ...................................... *G06F 13/32* (2013.01)
(58) Field of Classification Search
CPC ....................................................... G06F 13/32
See application file for complete search history.

(56) References Cited

U.S. PATENT DOCUMENTS

| 6,799,316 B1 * | 9/2004 | Aguilar et al. | 718/1 |
| 2010/0162242 A1 * | 6/2010 | Grouzdev | 718/1 |
| 2015/0040130 A1 * | 2/2015 | Ali et al. | 718/1 |

OTHER PUBLICATIONS

Taiwan Patent Office, Office Action, Patent Application No. 101109290, Apr. 11, 2014, Taiwan.
All I Know about SCI, http://diablo0709.blogspot.tw/2013/04/aii-i-know-about-sci.html, Apr. 10, 2013, 6 pages, Taiwan.
KBSMI & KBSCI, http://boy-asmc.blogspot.tw/2011/03/eckbsmi.html, Mar. 25, 2011, 3 pages,Taiwan.

* cited by examiner

*Primary Examiner* — Nimesh G Patel

(57) ABSTRACT

A virtual system management mode device, for processing a system management interrupt signal generated by a special process, includes a transformation unit, a control unit memory, and a control unit. The transformation unit transforms the system management interrupt signal into a virtual system management interrupt signal. The control unit memory stores a plurality of system management interrupt processes. The control unit executes one of the system management interrupt processes according to the virtual system management interrupt signal.

18 Claims, 3 Drawing Sheets

VIRTUAL SYSTEM MANAGEMENT MODE DEVICE AND CONTROL METHOD THEREOF

CROSS REFERENCE TO RELATED APPLICATIONS

This application claims priority of Taiwan Patent Application No. 101109290, filed on Mar. 19, 2012, the entirety of which is incorporated by reference herein.

BACKGROUND OF THE INVENTION

1. Field of the Invention

The disclosure relates generally to a virtual system management mode device, and more particularly relates to a system management mode for a computer system.

2. Description of the Related Art

Generally speaking, a conventional central processing unit (CPU) executes a system management interrupt operation by System Management Interrupt (SMI), and the central processing unit executes system management interrupt process. When the system management interrupt process is completed, a return system management command is generated, such that the interrupted operating system process may be continued. The system management interrupt process includes lots of functions, and is widely used in computer systems due to the great number of safety features available and high priority for processing. However, those functions depend on the support of a CPU. Once the CPU has no the system management interrupt mode, it would be more difficult to use the application of the related system management and keep the system management function safe. Therefore, in such a case, a method to replace a system management interrupt mode is needed.

BRIEF SUMMARY OF THE INVENTION

An embodiment of a virtual system management mode device according to the invention, for processing a system management interrupt (SMI) signal generated by a special process, is provided. The virtual system management mode device includes: a transformation unit for transforming the system management interrupt signal into a virtual system management interrupt signal; a control unit memory for storing a plurality of system management interrupt processes; and a control unit for executing one of the system management interrupt processes according to the virtual system management interrupt signal.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
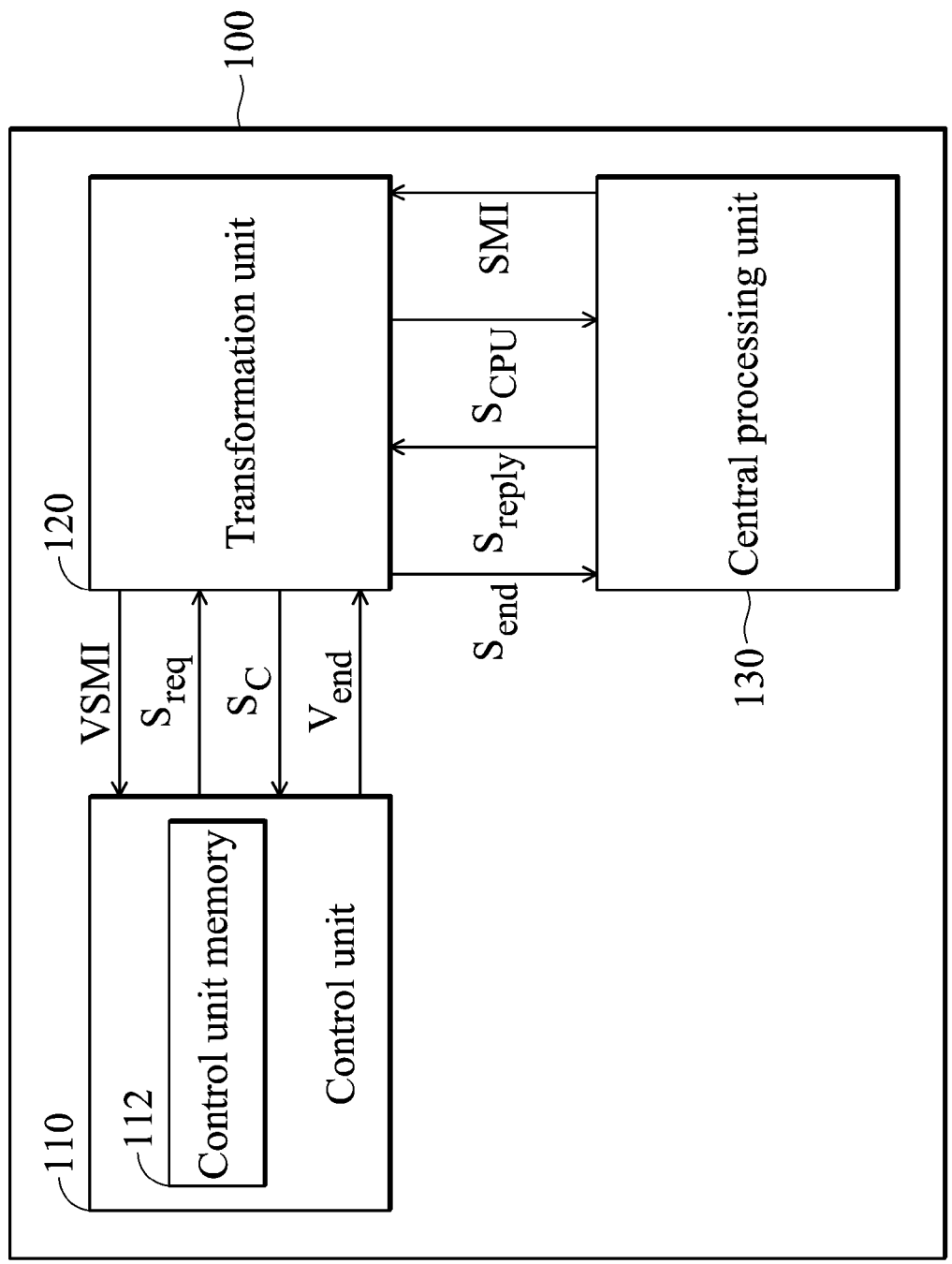
FIG. 1 is a schematic diagram illustrating an embodiment of a virtual system management mode device according to the invention.

FIG. 1 is a schematic diagram illustrating an embodiment of a virtual system management mode device 100 according to the invention for processing a system management interrupt signal SMI generated by a special process. The virtual system management mode device 100 includes a control unit 110, a control unit memory 112, a transformation unit 120, and a central processing unit 130. In some embodiments, the control unit 110 may be an embedded controller or a microprocessor, and the control unit memory 112 may store system management interrupt processes corresponding to the system management interrupt signal SMI. Also, due to the system management interrupt processes (such as obtaining a system password, temporary management, or power management) being very important parts for the system, the processing priorities thereof are set as the highest. Further, the operation of the system management interrupt processes is inaccessible to the operation system executed by the central processing unit 130. Thus, if the system management interrupt process is used improperly, the computer system would be unsafe. In order to prevent this situation, the control unit memory 112 is only accessible via the control unit 110. Namely, the other units besides the control unit 110 have no authority to access the data of the control unit memory 112.

Furthermore, the system management interrupt signal SMI may be generated by any unit of the computer system, or be generated through an application executed by the central processing unit 130. For example, a temporary management application can obtain a temporary of the computer system by generating a system management interrupt signal. However, the mechanism of the System Management Mode is designed for a central processing unit. Thus, in order to make the control unit 110 execute the system management process correctly, in some embodiments, the system management interrupt signal SMI may be transformed into a virtual system management interrupt signal VSMI which can be understood via the control unit 110. Note that although the system management interrupt signal SMI is generated via the central processing unit 130 in the embodiment of FIG. 1, the present invention is not limited thereto. Other devices can directly transmit the system management interrupt signal SMI to the transformation unit 120.

In an embodiment of the present invention, when the control unit 110 receives the virtual system management interrupt signal VSMI, the control unit 110 obtains a corresponding system management interrupt process from the control unit memory 112 according to the virtual system management interrupt signal VSMI, and the control unit 110 executes the corresponding system management interrupt process according to the virtual system management interrupt signal VSMI. In an embodiment, the control unit 110 can be performed by any embedded controller or microprocessor which has been included in the computer system. Therefore, when the control unit 110 receives the virtual system management interrupt signal VSMI, the present operation process is interrupt and stored. After the execution of the system management interrupt processes are finished, the process returns to the stored operation process.

In an embodiment, when the executed system management interrupt process executed by the control unit 110 has to obtain data of a selected device, the control unit 110 may be not able to access the data of the selected device. Because the selected device may not be directly connected to the control unit 110 and may be connected to the central processing unit 130, the data of the selected device may only be accessible via the central processing unit 130.

In some embodiments of the present invention, the control unit 110 may determine whether data of the selected device is accessible to the control unit 110. When the control unit 110 cannot access the data of the selected device, the transformation unit 120 can be a communication interface between the control unit 110 and the central processing unit 130, so that the control unit 110 can obtain the data of the selected device. For example, when the control unit 110 determines that the data of the selected device is not accessible, the control unit 110 transmits a request signal $S_{req}$ to the transformation unit 120 according to the system management interrupt process. The transformation unit 120 transforms the request signal $S_{req}$ into a central processing unit request signal $S_{CPU}$, and transmits the central processing unit request signal $S_{CPU}$ to the central processing unit 130 for notifying the central processing unit 130 to obtain the data of the selected device. Next, the central processing unit 130 obtains the data of the selected device according to the central processing unit request signal $S_{CPU}$ from the transformation unit 120, and transmits a reply signal $S_{reply}$ to the transformation unit 120 according to the data of the selected device. Finally, the transformation unit 120 transmits a control unit reply signal $S_C$ to the control unit 110 according to the reply signal $S_{reply}$, so that the control unit 110 can obtain the data of the selected device to process the system management interrupt process.

It should be noted that the transformation unit 120 can be a transformation mechanism and be included in the control unit 110 or the central processing unit 130. Therefore, when the control unit 110 and the central processing unit 130 transmit data to each other, the transformation unit 120 is provided as an interface transformation between the control unit 110 and the central processing unit 130 for information communication.

On the other hand, when the control unit 110 can directly access the data of the selected device, namely, the control unit 110 is directly connected to the selected device, the control unit 110 can directly obtain the data of the selected device to process the system management interrupt process.

In some embodiments of the present invention, the control unit 110 may transmit results data of the system management interrupt processes or any selected data to a selected device. Because the selected device may not be connected to the control unit 110 but connected to the central processing unit 130, the control unit 110 will determine whether the results data can be directly transmitted to the selected device.

When the control unit 110 determines that the selected data can be directly transmitted to the selected device, the control unit 110 directly transmits the selected data to the selected device. On the other hand, when the control unit 110 determines that the selected data cannot be directly transmitted to the selected device, the control unit 110 transmits a request signal $S_{req}$ to the transformation unit 120 according to the system management interrupt process. The transformation unit 120 transforms the request signal $S_{req}$ into a central processing unit request signal $S_{CPU}$, and transmits the central processing unit request signal $S_{CPU}$ to the central processing unit 130 for notifying the central processing unit 130 to send the selected data to the selected device. Next, the central processing unit 130 sends the selected data to the selected device according to the central processing unit request signal $S_{CPU}$ from the transformation unit 120.

In some embodiments of the present invention, when an application program tries to obtain the results data generated via the system management interrupt process, the central processing unit 130 generates a system management interrupt signal SMI according to the executed application program. After the transformation unit 120 receives the system management interrupt signal SMI, the transformation unit 120 transforms the system management interrupt signal SMI into a virtual system management interrupt signal VSMI. After the control unit 110 finishes executing the system management interrupt process according to the virtual system management interrupt signal VSMI, the next steps are the same as the embodiment described above, and the control unit 110 transmits the results data of the system management interrupt processes to a selected device. For example, the results data is stored in a specific memory address, and the application program may obtain the results data from the specific memory address and proceed to operate the corresponding process.

In some embodiments, the central processing unit can determine whether the application program has to wait for the system management interrupt process to finish. If so, the central processing unit stops executing the application program until the system management interrupt process finishes. For example, after the control unit 110 finishes the system management interrupt process, the control unit 110 transmits a virtual system management finish signal $V_{end}$ to the transformation unit 120. The transformation unit 120 transforms the virtual system management finish signal $V_{end}$ into a system management finish signal $S_{end}$, and transmits the system management finish signal $S_{end}$ to the central processing unit 130 for notifying the central processing unit 130 that the system management process has finished. Then, the central processing unit 130 may return to execute the application program.

Figure 2:
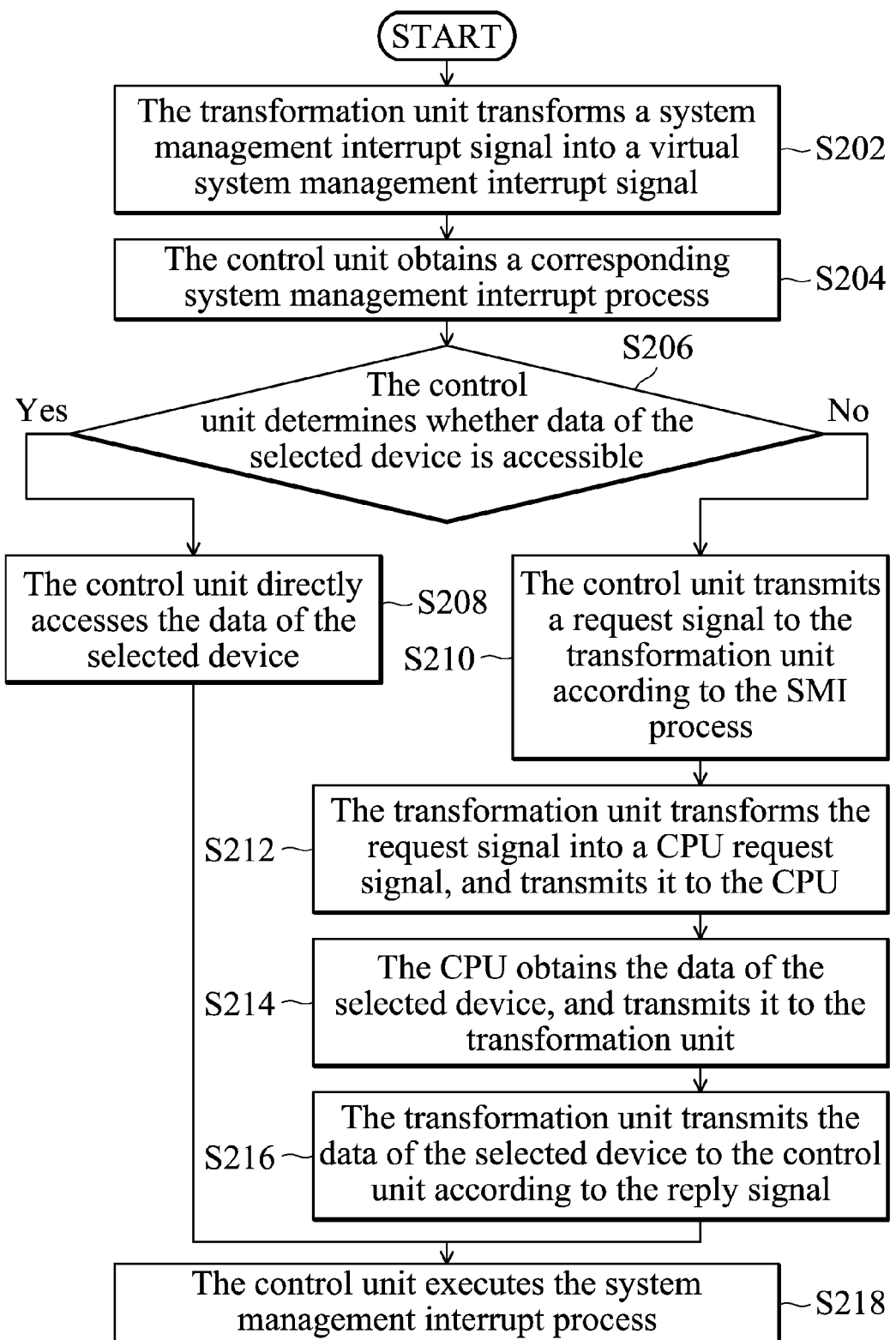
FIG. 2 is a flowchart of an embodiment of a method for the virtual system management mode device shown in FIG. 1 according to the invention.

FIG. 2 is a flowchart of an embodiment of a method for the virtual system management mode device shown in FIG. 1 according to the invention. In step S202, the transformation unit 120 receives a system management interrupt signal SMI and transforms the system management interrupt signal SMI into a virtual system management interrupt signal VSMI. In step S204, the control unit 110 obtains a corresponding system management interrupt process from the control unit memory 112 according to the virtual system management interrupt signal VSMI.

In step S206, the control unit 110 determines whether data of the selected device is accessible according to the obtained system management interrupt process. When the control unit 110 can directly access the data of the selected device, step S208 is performed. When the control unit 110 cannot directly access the data of the selected device, step S210 is performed.

In step S208, the control unit 110 accesses the data of the selected device. Next, the control unit 110 executes the system management interrupt process in step S218. In the step S210, the control unit 110 transmits a request signal $S_{req}$ to the transformation unit 120 according to the system management interrupt process. Next, in step S212, the transformation unit 120 transforms the request signal $S_{req}$ into a central processing unit request signal $S_{CPU}$, and transmits the central processing unit request signal $S_{CPU}$ to the central processing unit 130 for notifying the central processing unit 130 to obtain the data of the selected device. Next, in step S214, the central processing unit 130 obtains the data of the selected device according to the central processing unit request signal $S_{CPU}$ from the transformation unit 120, and transmits a reply signal $S_{reply}$ to the transformation unit 120 according to the data of the selected device. Finally, in step S216, the transformation unit 120 transmits a control unit reply signal $S_C$ to the control unit 110 according to the reply signal $S_{reply}$, so that the control unit 110 can obtain the data of the selected device to process the system management interrupt process.

Figure 3:
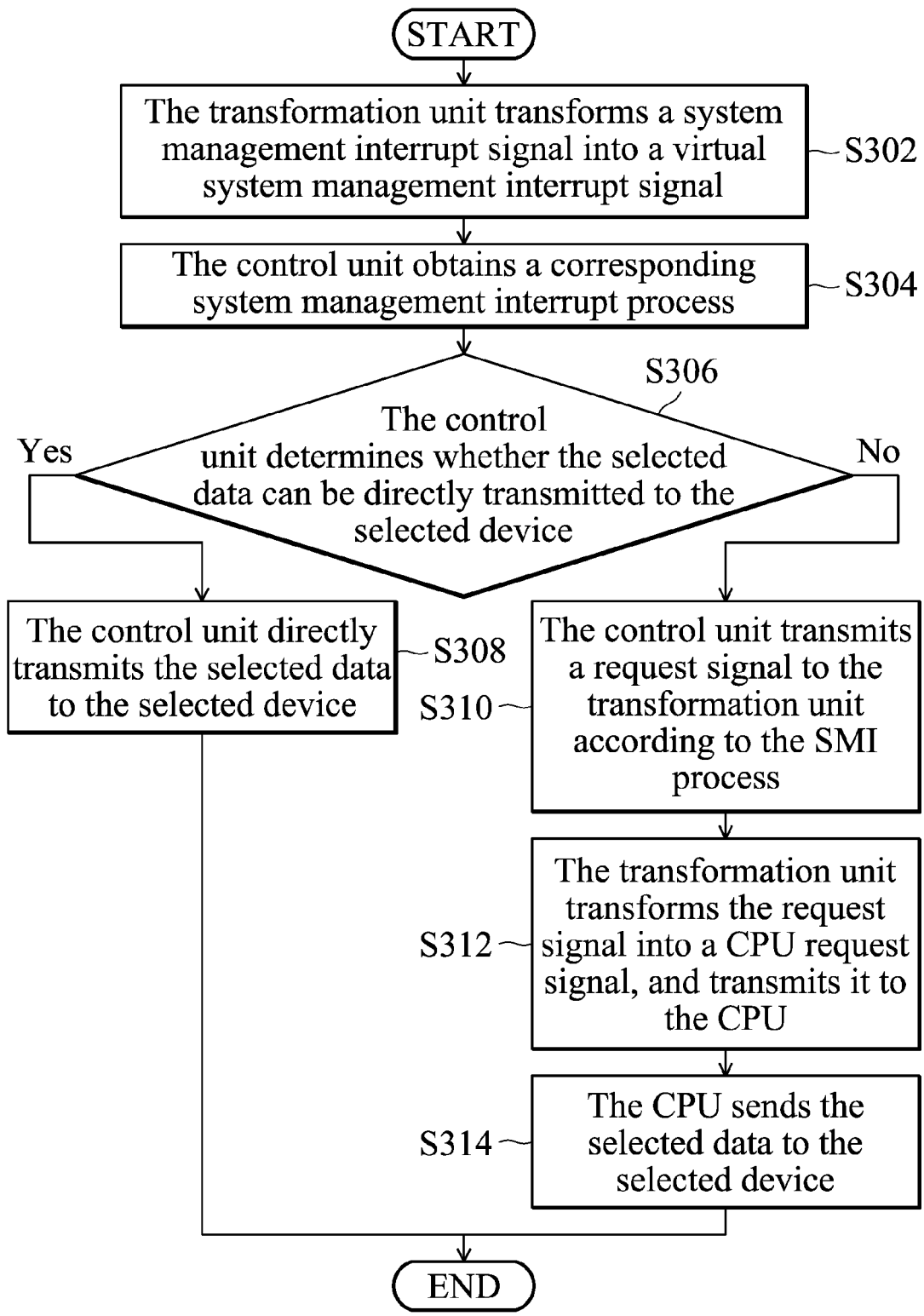
FIG. 3 is a flowchart of another embodiment of a method for the virtual system management mode device shown in FIG. 1 according to the invention.

FIG. 3 is a flowchart of another embodiment of a method for the virtual system management mode device shown in FIG. 1 according to the invention. In step S302, the transformation unit 120 receives a system management interrupt signal SMI and transforms the system management interrupt signal SMI into a virtual system management interrupt signal VSMI. In step S304, the control unit 110 obtains a corresponding system management interrupt process from the control unit memory 112 according to the virtual system management interrupt signal VSMI.

In step S306, the control unit 110 determines whether the selected data can be directly transmitted to the selected device. When the selected data can be directly transmitted to the selected device, step S308 is performed. When the selected data cannot be directly transmitted to the selected device, step S310 is performed.

In step S308, the control unit 110 directly transmits the selected data to the selected device. In step S310, the control unit 110 transmits a request signal $S_{req}$ to the transformation unit 120 according to the system management interrupt process. Next, in the step S312, the transformation unit 120 transforms the request signal $S_{req}$ into a central processing unit request signal $S_{CPU}$, and transmits the central processing unit request signal $S_{CPU}$ to the central processing unit 130 for notifying the central processing unit 130 to send the selected data to the selected device. Finally, in step S314, the central processing unit 130 sends the selected data to the selected device according to the central processing unit request signal $S_{CPU}$ from the transformation unit 120.

It should be noted that, those who are skilled in the art can delete, add, or change the order of the steps described above without departing from the scope and spirit of this invention. For example, the system management process executed via the central processing unit 130 may include multiple operations. Therefore, a system management process may include accessing data of a selected device (such as the flow chart of FIG. 2) and transmitting a selected data to a selected device (such as the flow chart of FIG. 3).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A virtual system management mode device, for processing a system management interrupt (SMI) signal generated by a special process, the virtual system management mode device comprising:
   a transformation unit for transforming the system management interrupt signal into a virtual system management interrupt signal;
   a control unit memory for storing a plurality of system management interrupt processes;
   a control unit for executing one of the system management interrupt processes according to the virtual system management interrupt signal; and
   a central processing unit, wherein when the executed system management interrupt process has to obtain a selected value of a selected unit, the control unit further determines whether the executed system management interrupt process is able to access the selected value of the selected unit, wherein when the executed system management interrupt process is not able to access the selected value of the selected unit, the control unit transmits a request signal to the transformation unit according to the executed system management interrupt process, and wherein the transformation unit transmits a CPU request signal to the central processing unit according to the request signal.

2. The virtual system management mode device of claim 1, wherein the central processing unit obtains the selected value of the selected unit according to the CPU request signal, and transmits a reply signal to the transformation unit, wherein the transformation unit transmits a control unit reply signal to the control unit according to the reply signal, and wherein the control unit obtain the selected value of the selected unit according to the control unit reply signal, and executes the executed system management interrupt process based on the selected value.

3. The virtual system management mode device of claim 1, wherein when the executed system management interrupt process is able to access the selected value of the selected unit, the control unit obtains the selected value of the selected unit according to the executed system management interrupt process and executes the executed system management interrupt process based on the selected value.

4. The virtual system management mode device of claim 1, wherein the central processing unit further executes the special process, and generates the system management interrupt signal according to the special process.

5. The computer integral device of claim 4, wherein after the central processing unit generates the system management interrupt signal according to the special process, the central processing unit temporarily stops executing the special process.

6. The computer integral device of claim 5, wherein when the control unit finishes executing the executed system management interrupt process, the control unit transmits a virtual system management finish signal to the transformation unit, wherein the transformation unit transmit a system management finish signal to the central processing unit according to the virtual system management finish signal, and wherein when the central processing unit receives the system management finish signal, the central processing unit restarts executing the special process.

7. The computer integral device of claim 1, wherein the control unit memory is only accessible via the control unit.

8. A virtual system management mode device, for processing a system management interrupt (SMI) signal generated by a special process, the virtual system management mode device comprising:
   a transformation unit for transforming the system management interrupt signal into a virtual system management interrupt signal;
   a control unit memory for storing a plurality of system management interrupt processes;
   a control unit for executing one of the system management interrupt processes according to the virtual system management interrupt signal; and
   a central processing unit, wherein the control unit further determines whether the executed system management interrupt process has to send a selected value to a selected unit, wherein when the executed system management interrupt process has to send the selected value to the selected unit, the control unit transmits a request signal to the transformation unit according to the executed system management interrupt process, wherein the transformation unit transmits a CPU request signal to the central processing unit according to the request signal, and wherein the central processing unit sends the selected value to the selected unit according to the request signal.

9. The virtual system management mode device of claim 8, wherein the control unit generates the selected value according to the executed system management interrupt process.

10. A virtual system management mode control method, for processing a system management interrupt (SMI) signal generated by a special process, the method comprising:
    transforming the system management interrupt signal into a virtual system management interrupt signal;
    storing a plurality of system management interrupt processes in a control unit memory; and
    executing one of the system management interrupt processes according to the virtual system management interrupt signal by a control unit;
    further comprising:
    when the executed system management interrupt process has to obtain a selected value of a selected unit, determining whether the executed system management interrupt process is able to access the selected value of the selected unit via the control unit;
    when the executed system management interrupt process is not able to access the selected value of the selected unit, transmitting a request signal to the transformation unit according to the executed system management interrupt process via the control unit; and
    transmitting a CPU request signal to a central processing unit according to the request signal.

11. The virtual system management mode control method of claim 10, further comprising:
    obtaining the selected value of the selected unit according to the CPU request signal via the central processing unit;
    generating a reply signal according to the obtained selected value via the central processing unit;
    transmitting a control unit reply signal to the control unit according to the reply signal;
    obtaining the selected value of the selected unit according to the control unit reply signal via the control unit; and
    executing the executed system management interrupt process based on the selected value via the control unit.

12. The virtual system management mode control method of claim 10, further comprising:
    when the executed system management interrupt process is able to access the selected value of the selected unit, obtaining the selected value of the selected unit according to the executed system management interrupt process via the control unit; and
    executing the executed system management interrupt process based on the selected value via the control unit.

13. The virtual system management mode control method of claim 10, further comprising:
    generating the system management interrupt signal according to the special process via the central processing unit.

14. The virtual system management mode control method of claim 13, further comprising:
    after the central processing unit generates the system management interrupt signal according to the special process, temporarily stopping, the execution of the special process.

15. The virtual system management mode control method of claim 14, further comprising:
    when the control unit finishes executing the executed system management interrupt process, transmitting a virtual system management finish signal to the transformation unit via the control unit;
    transmitting a system management finish signal to the central processing unit according to the virtual system management finish signal; and
    when the central processing unit receives the system management finish signal, restarting execution of the special process.

16. The virtual system management mode control method of claim 10, wherein the control unit memory is only accessible via the control unit.

17. A virtual system management mode control method, for processing a system management interrupt (SMI) signal generated by a special process, the method comprising:
    transforming the system management interrupt signal into a virtual system management interrupt signal;
    storing a plurality of system management interrupt processes in a control unit memory; and
    executing one of the system management interrupt processes according to the virtual system management interrupt signal by a control unit;
    further comprising:
    determining whether the executed system management interrupt process has to send a selected value to a selected unit via the control unit;
    when the executed system management interrupt process has to send the selected value to the selected unit, generating a request signal according to the executed system management interrupt process via the control unit;
    transmitting a CPU request signal to a central processing unit according to the request signal; and
    sending the selected value to the selected unit according to the request signal via the central processing unit.

18. The virtual system management mode control method of claim 17, further comprising:
    generating the selected value according to the executed system management interrupt process via the control unit.

* * * * *